US008477881B2

(12) United States Patent
Cao

(10) Patent No.: US 8,477,881 B2
(45) Date of Patent: Jul. 2, 2013

(54) METHOD AND APPARATUS FOR DETERMINING RECEIVER BEAM FORMING VECTORS IN MULTI-USER MIMO SYSTEMS

(75) Inventor: Fengming Cao, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 12/830,679

(22) Filed: Jul. 6, 2010

(65) Prior Publication Data

US 2011/0007850 A1    Jan. 13, 2011

(30) Foreign Application Priority Data

Jul. 8, 2009 (GB) .................................. 0911901.7

(51) Int. Cl.
*H04L 27/06* (2006.01)
(52) U.S. Cl.
USPC .......................................................... 375/340
(58) Field of Classification Search
None
See application file for complete search history.

(56) References Cited

U.S. PATENT DOCUMENTS

| 7,263,123 | B2 * | 8/2007 | Yousef ........................... | 375/233 |
| 7,873,021 | B2 * | 1/2011 | Petre et al. ..................... | 370/342 |
| 8,233,556 | B2 * | 7/2012 | Waters et al. ................... | 375/267 |
| 2004/0120274 | A1 * | 6/2004 | Petre et al. ..................... | 370/320 |
| 2007/0066229 | A1 | 3/2007 | Zhang et al. | |
| 2007/0092019 | A1 | 4/2007 | Kotecha et al. | |
| 2007/0155336 | A1 | 7/2007 | Nam et al. | |
| 2008/0019457 | A1 * | 1/2008 | Waters et al. ................... | 375/267 |
| 2008/0084944 | A1 | 4/2008 | Park et al. | |
| 2008/0130803 | A1 | 6/2008 | Chang et al. | |

FOREIGN PATENT DOCUMENTS

| EP | 1 782 554 A1 | 5/2007 |
| JP | 2008-511219 A | 4/2008 |
| JP | 2008-131274 A | 6/2008 |
| JP | 2009-17011 A | 1/2009 |
| JP | 2009-500939 A | 1/2009 |
| JP | 2009-290449 A | 12/2009 |
| JP | 2010-252322 A | 11/2010 |
| WO | WO 2006/021224 A1 | 3/2006 |
| WO | WO 2006021224 A1 * | 3/2006 |

(Continued)

OTHER PUBLICATIONS

Cong Li, Yasunori Iwanami, and Eiji Okamoto,"Comparative study for Tomlinson-Harashima Precoding based on MMSE criteria in Multiuser MIMO downlink system", IEEE TENCON 2009.*

(Continued)

*Primary Examiner* — Daniel Washburn
*Assistant Examiner* — Bahman Badipour
(74) *Attorney, Agent, or Firm* — Oblon, Spivak, McClelland, Maier & Neustadt, L.L.P.

(57) ABSTRACT

According to one embodiment there is provided a method of determining receiver beam forming vectors for a plurality of receivers in a MIMO system. Each receiver comprises a plurality of receiver antennae. The MIMO system also comprises a plurality of transmitter antennae. The method comprises quantifying the properties of the channels of the MIMO system in a channel property matrix including interference between individual channels and performing Cholesky decomposition of the receiver property matrix row-by-row into a lower triangular matrix with unit elements along its diagonal, a diagonal matrix and the Hermitian transpose of said triangular matrix. Performing the Cholesky decomposition comprises determining, when performing a step of the Cholesky decomposition for a row, a receiver-beam forming vector associated with the row that maximises the component of the diagonal matrix in the row.

11 Claims, 7 Drawing Sheets

FOREIGN PATENT DOCUMENTS

| | | |
|---|---|---|
| WO | WO 2007/061416 A1 | 5/2007 |
| WO | WO 2008/021008 A2 | 2/2008 |
| WO | WO 2008/068582 A2 | 6/2008 |
| WO | WO 2009/075456 A1 | 6/2009 |

OTHER PUBLICATIONS

Amine Mezghani, Raphael Hunger, Michael Joham, and Wolfgang Utschick, "Iterative THP Transceiver Optimization for Multi-User MIMO Systems Based on Weighted SUM-MSE Minimization", Proc. IEEE 7th Workshop on Signal Processing Advances in Wireless Communications, Jul. 2006.*

W. Miao, L. Xiao, Y. Li, S. Zhou, and J. Wang, "Joint stream-wise THP transceiver design for the multiuser MIMO downlink," in Proc. IEEE Wireless Communications and Networking Conference, Mar. 2008.*

Office Action issued Jun. 26, 2012 in Japanese Patent Application No. 2010-156098 (with English-language translation).

Jia Liu, et al., "A Minimum Mean-Square Error Criterion Based Nonlinear Joint Transmitter-Receiver Processing Algorithm for the Downlink of Multi-User MIMO Systems", IEEE, VTC, vol. 4, May 7-10, 2006, pp. 1982-1987.

Roya Doostnejad, et al., "Joint Preceding and Beamforming Design for the Downlink in a Multiuser MIMO System", IEEE International Conference on Wireless and Mobile Computing, Networking and Communications, vol. 1, Aug. 22-24, 2005, pp. 153-159.

Antonio A. D'Amico, et al., "Joint Tx-Rx MMSE Design for MIMO Multicarrier Systems with Tomlinson-Harashima Preceding", IEEE Transactions on Wireless Communications, vol. 7, No. 8, Aug. 2008, pp. 3118-3127.

Katsutoshi Kusume, et al., "Cholesky Factorization With Symmetric Permutation Applied to Detecting and Precoding Spatially Multiplexed Data Streams", IEEE Transactions on Signal Processing, vol. 55, No. 6, Jun. 2007, pp. 3089-3103.

Min Huang, et al., "Per-Layer Optimization in Multiuser MIMO Systems with Tomlinson-Harashima Precoding", IEICE Transactions Commun., vol. E90-B, No. 6, Jun. 2007, pp. 1535-1539.

* cited by examiner

```
For k = 1 : i -1                                              Step 200
    if k==1                                                   Step 210
                                                              Step 220
```
$$l_{i1} = \frac{\hat{h}_i \hat{h}_1^H}{q_1} = r_i \frac{H_i \hat{h}_1^H}{q_1} = r_i s_{i1}$$

```
    Else
```
$$l_{ik} = \frac{(\hat{h}_i \hat{h}_k^H - \sum_{n=1}^{k-1} l_{in} l^*_{kn} q_n)}{q_k}$$

Step 230

$$= \frac{(r_i H_i \hat{h}_k^H - \sum_{n=1}^{k-1} r_i s_{in} l^*_{kn} q_n)}{q_k}$$

$$= r_i \frac{(H_i \hat{h}_k^H - \sum_{n=1}^{k-1} s_{in} l^*_{kn} q_n)}{q_k}$$

$$= r_i s_{ik}$$

```
    End if
End For
```

Fig. 3

METHOD AND APPARATUS FOR DETERMINING RECEIVER BEAM FORMING VECTORS IN MULTI-USER MIMO SYSTEMS

CROSS-REFERENCE TO RELATED APPLICATION(S)

This application is based upon and claims the benefit of priority from UK Patent Application No. 0911901.7, filed on 8 Jul. 2009, the entire contents of which is incorporated herein by reference.

FIELD

Embodiments described herein relate generally to a method and apparatus for use in a multi-user multiple input multiple output (MIMO) system. Embodiments described herein relate to a method and an apparatus for determining one or more of receiver beam forming and transmitter precoding and feedback matrices for use in such a system.

BACKGROUND

Multi-user multiple input multiple output precoding techniques are attractive for practical MIMO system deployment thanks to their potential to increase the system's capacity. In multiple input multiple output systems employing precoding, channel knowledge is used at the transmitter in order to enhance the link quality. A recent development relates to nonlinear precoding/multi-user MIMO. This technique shows promise for improving the system capacity. Among nonlinear precoding schemes, Tomlinson-Harashima precoding (THP) is one of popular schemes due to its simplicity and good performance. A potentially practical scheme is the minimum means square error (MMSE) THP proposed by K. Kusume, M. Joham, W. Utschick, and G. Bauch in "Cholesky factorization with symmetric permutation applied to detecting and precoding spatially multiplexed data streams," IEEE Trans. on Signal Proc., vol. 55, no. 6, pp. 3089-3103, 2007, the entirety of which is incorporated herein by this reference. This scheme provides good performance in terms of bit error rate (BER).

BRIEF DESCRIPTION OF THE DRAWINGS

An embodiment of the present invention will now be described by way of example only and with reference to the accompanying drawings, in which:

FIG. 3 shows a pseudo code for one part of the Cholesky decomposition method of an embodiment;

DETAILED DESCRIPTION

Figure 1:
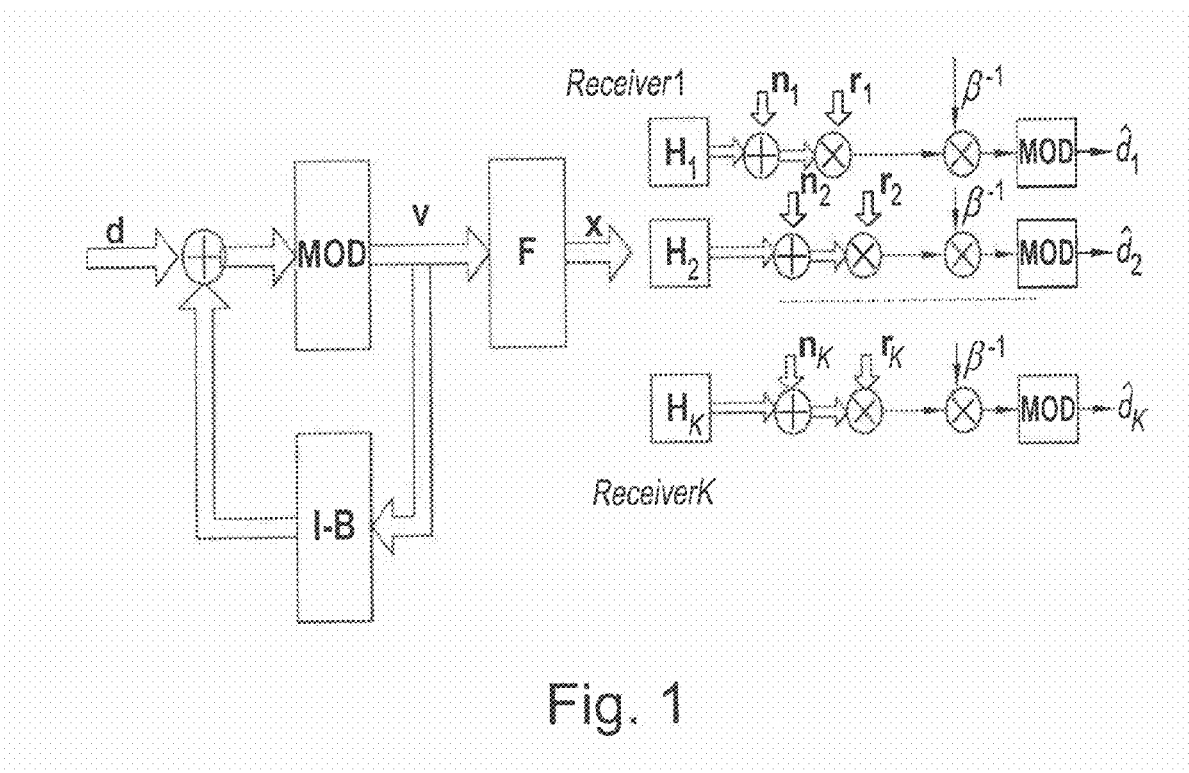
FIG. 1 shows a block diagram of a multi-user Tomlinson-Harashima precoding (THP) system.

According to one embodiment there is provided a method of determining receiver beam forming vectors for a plurality of receivers in a MIMO system. Each receiver comprises a plurality of receiver antennae. The MIMO system also comprises a plurality of transmitter antennae. The method comprises quantifying the properties of the channels of the MIMO system in a channel property matrix including interference between individual channels and performing Cholesky decomposition of the receiver property matrix row-by-row into a lower triangular matrix with unit elements along its diagonal, a diagonal matrix and the Hermitian transpose of said triangular matrix. Performing the Cholesky decomposition comprises determining, when performing a step of the Cholesky decomposition for a row, a receiver-beam forming vector associated with the row that maximises the component of the diagonal matrix in the row.

The channel property matrix may also comprise an indication or quantification of the noise expected to be present in the channels. The plurality of receivers may be non-cooperating receivers. The receiver beam forming vectors of all of the receivers of the MIMO system may thus be expressed in a block diagonal matrix.

The component of the diagonal matrix may be maximised by determining the left singular vector of a matrix quantifying the characteristics of the channel associated with a said element of the diagonal matrix. The left singular vector may be the left singular vector associated with the maximum singular value of the matrix. The matrix quantifying the characteristics of the said channel may quantify channel gain, channel noise and the said channel's interference with channels of receivers for which a beam forming vector had previously been determined.

According to another embodiment there is provided a method of determining a receiver beam forming vector for a receiver of a plurality of receivers in a MIMO system, wherein each receiver comprises plural receiver antennae. The method comprises forming a matrix quantifying the properties of a channel of the receiver and the interference the said receiver experiences from other receivers for which a receiver beam forming vector had previously been determined. The receiver beam forming vector can then be determined. This includes determining the left singular vector of the matrix that quantifies the properties of a channel of the receiver and the interference the said receiver experiences from other receivers.

The matrix quantifying the characteristics of the said channel may be:

$$H_i H_i^H + \gamma I_{N_r} - \sum_{j=1}^{i-1} s_{i,j} s_{ij}^H q_j$$

for the second and subsequent rows/steps of the Cholesky decomposition, wherein $H_i$ is the channel matrix of the receiver associated with the current row/step of the Cholesky decomposition, $H_i^H$ is the Hermitian transpose of $H_i$, $\gamma$ is the expectation of the noise that will be received, $I_{N_r}$ is an $N_r \times N_r$ identity matrix, wherein $N_r$ is the number of receiver antennae of the receiver, $s_{ij}$ is $$s_{ij} = \begin{cases} \dfrac{H_i \tilde{h}_j^H}{q_1} & \text{if } j = 1 \\[2ex] \dfrac{\left(H_i \tilde{h}_j^H - \sum_{n=1}^{j-1} s_{in} l_{jn}^* q_n\right)}{q_j} & \text{if } j > 1 \end{cases}$$

$\hat{h}_j^H$ is the Hermitian transpose of $r_j H_j$, wherein $r_j$ is the receiver beam forming vector associated with the j-th element of the diagonal matrix, $H_j$ is the channel matrix associated with the j-th element of the diagonal matrix, $q_j$ is:

$$q_i = \Psi_{ii} - \sum_{k}^{i-1} l_{ik} l_{ik}^* q_k$$

wherein:

$$l_{ij} = \frac{1}{q_j}\left(\Psi_{ij} - \sum_{n}^{j-1} l_{in} l_{jn}^* q_n\right), \text{ for } i > j$$

$$l_{ij} = 1, \text{ for } i = j$$

$$l_{ij} = 0, \text{ for } i < j$$

$$\Psi_{ii} = \hat{h}_i \hat{h}_i^H + \gamma \text{ and } \Psi_{ij} = \hat{h}_i \hat{h}_j^H$$

$$\hat{h}_i = r_i H_i,$$

$s_{ij}^H$ is the Hermitian transpose of $s_{ij}$, $l_{jn}^*$ is the conjugate of $l_{jn}$. The j-th element may be an element that has previously been determined. $N_r$ may be the number of receiver antennae of each receiver. For the second and subsequent rows/steps of the Cholesky decomposition the sum term in the matrix quantifying the characteristics of the channel may be zero as interference with other channels needs to be taken into account. The receiver beam forming vector may have unit norm.

The matrices provided by the Cholesky decomposition of the channel property matrix $\Psi$ can be expressed as:

$$\Psi = LQL^H$$

$$= \begin{pmatrix} 1 & 0 & \cdots & 0 \\ l_{21} & 1 & \cdots & 0 \\ \cdots & \cdots & \cdots & \cdots \\ l_{K1} & l_{K2} & \cdots & 1 \end{pmatrix} \begin{pmatrix} q_1 & 0 & \cdots & 0 \\ 0 & q_3 & \cdots & 0 \\ \cdots & \cdots & \cdots & \cdots \\ 0 & 0 & \cdots & q_K \end{pmatrix} \begin{pmatrix} 1 & l_{21}^* & \cdots & l_{K1}^* \\ 0 & 1 & \cdots & l_{K2}^* \\ \cdots & \cdots & \cdots & \cdots \\ 0 & 0 & \cdots & 1 \end{pmatrix}$$

wherein L is the lower triangular matrix with unit elements along its diagonal, Q is the diagonal matrix and $L^H$ is the Hermitian transpose of L, wherein $q_1$ to $q_k$ are the elements of the diagonal matrix defined as:

$$q_i = \Psi_{ii} - \sum_{k}^{i-1} l_{ik} l_{ik}^* q_k$$

wherein:

$$l_{ij} = \frac{1}{q_j}\left(\Psi_{ij} - \sum_{n}^{j-1} l_{in} l_{jn}^* q_n\right), \text{ for } i > j$$

$$\Psi_{ii} = \hat{h}_i \hat{h}_i^H + \gamma \text{ and } \Psi_{ij} = \hat{h}_i \hat{h}_j^H$$

$$\hat{h}_i = r_i H_i$$

wherein $l_{ik}^*$ is the conjugate of $l_{ik}$, $H_i$ is the channel matrix of the receiver associated with the current row/step of the Cholesky decomposition, $\gamma$ is the expectation of the noise that will be received and $r_i$ is the receiver beam forming vector associated with the current row/step of the Cholesky decomposition. $I_{ij}$ may be determined after each determination of $q_i$.

The above method is such that it allows determination of the receiver beam forming vectors for all desired receivers before precoding and/or feedback matrices that may be used in the transmitter have to be determined. Such a transmitter may be a transmitter that employs Tomlinson-Harashima precoding (THP), for example Minimum Means Square Error (MMSE) THP. The method may thus further comprise determining a precoding and/or a feedback matrix for a transmitter using Tomlinson-Harashima precoding after two or more of the receiver beam forming vectors have been determined. The precoding and/or feedback matrices may be determined after all of the receiver beam forming vectors have been calculated.

The method may further comprise receiving signals at one or more of the plurality of antennae of a said receiver and combining the signals using the receiver beam forming vector.

The above discussion has focussed on scenarios where the number of users participating in the MIMO system may correspond to the number of users that can participate in the system. Frequently, however, the number of users attempting to participate in a MIMO system exceeds the maximum number of users of such a system.

In such as situation it may be necessary to exclude users from participation in data transmission in the MIMO system. It is desirable that only users maximising transmission quality are selected for data transmission in the MIMO system. As discussed above, the selection of a correct receiver beam forming vector can minimise the mean square error associated with signal transmission. The receiver beam forming vector that minimises MSE is the receiver beam forming vector that maximises an associated component of the diagonal matrix calculated by Cholesky decomposition. It would thus be desirable to determine from among a number of thus far unselected receivers the one receiver that maximises the associated element of the diagonal matrix created by Cholesky decomposition of a channel property matrix quantifying not only the channel properties associated with a receiver in question but also the properties of a channels associated with previously selected receivers.

To achieve the above, a channel property matrix may be defined for two or more or even for each thus far unselected receiver. This channel property matrix may quantify the properties of the channel associated the unselected receiver as well as the properties of the channels of all thus far selected receivers. Cholesky decomposition may then be performed for the channel property matrix and a receiver beam forming vector maximising the element of the diagonal matrix associated with the unselected receiver can be determined. This determination also provides a value for the associated element of the diagonal matrix. As this computation can be performed for two or more or even for each of the thus far unselected receivers, the receiver providing the maximum element of the diagonal matrix can be determined. This receiver is the one of the thus far unselected receivers under consideration that minimises the mean square transmission error. This receiver may then be selected.

According to another embodiment there is provided a method of selecting a user from a plurality of un-selected users for participation in signal transmission in a MIMO system comprising a plurality of transmitter antennae and a plurality of receivers. Each receiver in the system comprises a plurality of receiver antennae. The method comprises performing individually for more than one of the unselected users a quantification of the properties of the receiver channel of the unselected user and of receiver channels of previously selected users, if any, in a receiver property matrix. This quantification includes a quantification of interference between individual channels. Cholesky decomposition of the receiver property matrix row-by-row into a lower triangular matrix with unit elements along its diagonal, a diagonal matrix and the Hermitian transpose of said triangular matrix is then performed for each of the individually determined receiver property matrices. When a step of the Cholesky decomposition is performed for a row, a receiver beam forming vector associated with the row is determined such that the receiver beam forming vector maximises the component of the diagonal matrix in the row. The method further comprising selecting from among the more than one unselected users the user having the maximum diagonal matrix component. Selection of users for participation in data transmission in the MIMO system provides a further opportunity to improve performance.

Each of the thus far unselected users may be considered in this manner, although doing so is not essential and only a smaller sub-set of the thus far unselected users may instead be considered.

Any of the above methods may further comprise receiving signals at the plurality of antennae of a said receiver and combining the signals using the receiver beam forming vector.

According to another embodiment there is provided a device for determining receiver beam forming vectors for a plurality of receivers in a MIMO system in which each receiver comprises a plurality of receiver antennae and that further comprises a plurality of transmitter antennae. The device comprises a quantifier for quantifying in a channel property matrix the properties of receiver channels of the MIMO system, including interference between individual channels and a processor arranged to perform Cholesky decomposition of the received matrix in a row-by-row fashion into a lower triangular matrix with unit elements along its diagonal, a diagonal matrix and the Hermitian transpose of the lower triangular matrix. The processor is further arranged to determine, when performing a step of the Cholesky decomposition for a row, a receiver beam forming vector associated with the row that maximises the component of the diagonal matrix in the row.

Embodiments also extend to a transmitter for use in a MIMO system, wherein the transmitter comprises apparatus for selecting a user or users from a plurality of un-selected users. Embodiments also extend to a MIMO system comprising such a transmitter.

According to another embodiment there is provided a device for determining a receiver beam forming vector for a receiver of a plurality of receivers in a MIMO system, wherein each receiver comprises plural receiver antennae. The device comprises a quantifier for quantifying in a matrix the characteristics of a channel of the receiver and the interference the said receiver experiences from other receivers for which a receiver beam forming vector had previously been determined. The device further comprises a processor arranged to determine the receiver beam forming vector, wherein the processor is arranged to determine the left singular vector of the matrix.

Embodiments also extends to a transmitter for use in a MIMO system, wherein the transmitter comprises the device for determining the receiver beam forming vectors. Embodiments also extends to a MIMO system comprising the device for determining the receiver beam forming vectors.

According to another embodiment there is provided an apparatus for selecting a user from a plurality of un-selected users for participation in signal transmission in a MIMO system comprising a plurality of transmitter antennae and a plurality of receivers, wherein each receivers comprises a plurality of receiver antennae. The apparatus is arranged to, individually for more than one of the unselected users, quantify the properties of the receiver channel of the unselected user and of receiver channels of previously selected users, if any, in a receiver property matrix including interference between individual channels. The apparatus is further arranged to, again individually for more than one of the unselected users, perform Cholesky decomposition of the receiver property matrix row-by-row into a lower triangular matrix with unit elements along its diagonal, a diagonal matrix and the Hermitian transpose of said triangular matrix. When a step of the Cholesky decomposition is performed for a row a receiver beam forming vector that is associated with the row is determined, wherein the receiver beam forming vector is determined such that it maximises the component of the diagonal matrix in the row. The apparatus is further arranged to select from among the more than one unselected users the user having the maximum diagonal matrix component.

FIG. 1 shows a block diagram of a multi-user Tomlinson-Harashima precoding (THP) system. The system comprises a transmitter 10 with K transmitter antennae in communication with K receivers 20. Each receiver 20 has $N_r \geq 1$ receiver antenna. The channel matrix characterising the channels between all of the transmitter antennae and the receivers 20 can be expressed as:

$$H=[H_1^T, \ldots, H_K^T]^T \in C^{KN_T \times K} \quad (1)$$

wherein $$H_k \in C^{N_T \times K} \quad (2)$$

is the $k^{th}$ receiver's channel. These receiver channels of the individual receivers are indicated in FIG. 1 by reference numerals 30.

The transmitter 10 of the THP system generates a spatial stream $v \in C^{K \times 1}$ from a data stream vector $d \in C^{K \times 1}$ that is to be transmitted to the receivers 20. K is precoded using precoding matrix $F \in C^{K \times K}$ (identified by reference numeral 40) to form signals x, for transmission to the receivers 20 via the channels 30. The signal y received at the receivers 20 can be modelled as:

$$y=HFv+n \quad (3)$$

wherein n is the noise vector for all the receivers:

$$n=[n_1^T, \ldots, n_K^T]^T \in C^{KN_T \times 1} \quad (4)$$

The elements of n have zero-mean Gaussian distribution.

The spatial streams v is generated from the signal vector d through use of a feedback filter 60 according to:

$$v=B^{-1}d \quad (5)$$

where $B \in C^{K \times K}$ is a lower triangular matrix with unit diagonal elements.

The modulo operation 60 shown in FIG. 1 is introduced to reduce the transmitter power increase due to the implementation of the inverse of B. Equation (5) thus becomes:

$$v=B^{-1}(d+\tau a) \quad (6)$$

wherein a is a complex integer vector and $\tau$ is a positive real number depending on the modulation schemes. For QAM modulation $\tau$ could be:

$$\tau=2(|c|_{max}+\Delta/2) \quad (7)$$

where $|c|_{max}$ is the absolute value of the real or imaginary part of the modulation constellation symbol with greatest magnitude, and $\Delta$ is the smallest distance between two modulation constellation symbols. The vector of a can be found by a simple modulo operation and the detail of the modulo operation can be found in section IV of the above incorporated paper by Kusume.

Turning now to the receiver, the data stream at each receiver could be estimated by equalization as:

$$\hat{d}=\beta^{-1}Ry=\beta^{-1}R(HFv+n) \quad (8)$$

where $\beta$ is a scalar used to normalize the transmit power. In THP the receivers are assumed to act independently from each other. For this reason the receiver beam forming matrix $R \in C^{K \times K \cdot N_r}$ is a unity matrix for $N_r=1$, i.e. if each receiver only comprises a single receiver antenna. If each receiver comprises more than one receiver antennae, that is for $N_r>1$, the beam forming matrix R is a block diagonal matrix:

$$R = \begin{bmatrix} r_1 & 0 & 0 & 0 \\ 0 & r_2 & 0 & 0 \\ 0 & 0 & \cdots & 0 \\ 0 & 0 & 0 & r_K \end{bmatrix} \quad (9)$$

with $r_k \in \mathbb{C}^{1 \times N_T}$ is the receiver beam forming vector for $k^{th}$ receiver.

The error between the received signal $\hat{d}$ and the data stream vector d that was transmitted and the covariance matrix of this error are respectively:

$$\epsilon = \hat{d} - d \quad (10)$$

$$\Phi_{\epsilon\epsilon} = E[\epsilon\epsilon^H] \quad (11)$$

where E[.] denotes the expectation.

The total mean square error (MSE) can be obtained as:

$$\rho = E(tr(\epsilon\epsilon^H)) = tr(E(\epsilon\epsilon^H)) = tr(\Phi_{\epsilon\epsilon}) \quad (12)$$

where $tr(\bullet)$ represents trace of matrix. The optimal R, F, B and $\beta$ with minimum mean square error (MMSE) criteria can be obtained by minimizing the mean square error $\rho$ and the problem formulation to find the optimal R, F, B and $\beta$ is as follows:

$$\{F_{opt}, R_{opt}, B_{opt}, \beta_{opt}\} = \underset{F,R,B,\beta}{\operatorname{argmin}}\{tr(\Phi_{\epsilon\epsilon})\} \quad (13)$$

and subject to the following condition:

$$tr(F\Phi_{vv}F^H) = E_S \quad (14)$$

where:

$$\Phi_{vv} = E[vv^H] \quad (15)$$

and $E_S$ is the transmit power.

Equation (8) can be rewritten as:

$$\hat{d} = \beta^{-1}Ry = \beta^{-1}R(HFv+n) = \beta^{-1}(\hat{H}Fv+\hat{n}) \quad (16)$$

wherein $$\hat{H} = RH = [(r_1H_1)^T, \ldots, (r_KH_K)^T]^T = [(\hat{h}_1)^T, \ldots, (\hat{h}_K)^T]^T \text{ and} \quad (17)$$

$$\hat{n} = Rn$$

The noise power is kept unchanged by constraining the receiver beam forming vector so that it has unit norm. This keep the covariance matrix of $\hat{n}$ that same as that of n, i.e. $\Phi_{\hat{n}\hat{n}} = \Phi_{nn}$.

Kusume et. al., referred to above, provides a MMSE solution for the case that each receiver comprises a single receiver antenna only, that is for $N_r=1$. As mentioned above, in this case the receiver beam forming matrix is simply the identity matrix and does not need to be determined. Kusume characterises the transmission of signals by defining:

$$\Psi = (\hat{H}\hat{H}^H + \gamma I) = LQL^H \quad (18)$$

where L is a lower triangular matrix with unit diagonal and Q is a diagonal matrix. L and Q can be jointly calculated using a Cholesky decomposition. Moreover:

$$\gamma = \frac{tr(\Phi_{\hat{n}\hat{n}})}{E_S} \quad (19)$$

that is the expectation of the noise received together with the signal after combination of the received signals using the receiver combination vectors and normalised by the transmitter power $E_S$. In a practical system, the covariance matrix $\Phi_{\hat{n}\hat{n}}$ of $\hat{n}$ can be determined once a transmitter has acquired knowledge of the noise power of the receivers. $\gamma$ can then be computed using equation (19).

The feedback matrix and the precoding matrix can be obtained according to:

$$\bar{B} = L \quad (20)$$

$$\bar{F} = \bar{\beta}\hat{F} = \bar{\beta}\hat{H}^H L^{-H} Q^{-1} \quad (21)$$

wherein $$\hat{F} = \hat{H}^H L^{-H} Q^{-1} \quad (22)$$

$$\bar{\beta} = \sqrt{\frac{E_S}{\|\hat{F}(:,1)\|_2^2 + \sigma_v^2 \|\hat{F}(:,2:K)\|_F^2}}$$

where $\sigma_v^2 = \frac{\mu}{\mu - 1}$ represents the precoding loss due to modulo operation at receiver and $\mu$ is the modulation order.

In a MIMO system comprising receivers with one receive antenna each the receiver beam forming matrix is the identity matrix, as discussed above. Based on $\bar{F}$, $\bar{B}$ and $\bar{\beta}$ determined using equations (20) to (22), the MSE of equation (12) can thus be calculated as:

$$\rho(\bar{R}, \bar{F}, \bar{B}, \bar{\beta}) = \gamma \sum_{i=1}^{K} \frac{\sigma_{vj}^2}{q_i} \quad (23)$$

where $\sigma_{vj}^2 = 1$ for $j=1$ and $\sigma_{vj}^2 = \sigma_v^2$ for $j>1$ and $q_i$ is the i-th diagonal element of matrix Q in equation (18).

The above pre-coding matrix and feedback matrix are generated with given receiver ordering. Kusume et. al., referred to above, also discloses two receiver ordering algorithms for further improving the performance of the disclosed method.

These algorithms are summarised in tables VI and VII of Kusume et. al. respectively, which are incorporated herein by this reference.

Techniques for generating the pre-coding and feedback matrices exist. These techniques, however, make assumptions that relax the constraints in equation (13).

As mentioned above, the MMSE solution suggested by Kusume et. al. focuses on a scenario where each receiver comprises a single antenna, $N_r=1$. In this case the receiver beam forming matrix R is the identity matrix and thus does not need to be separately determined. If the receivers 20, however, comprise more than one receiver antennae, $N_r>1$, then it is necessary for the receiver beam forming matrix R to be determined, before $\overline{F}$, $\overline{B}$ and $\overline{\beta}$ can be obtained based on equations (20), (21) and (22). As R, $\overline{F}$, $\overline{B}$ and $\overline{\beta}$ are mutually embedded in equations (20), (21) and (22), $\overline{F}$, $\overline{B}$ and $\overline{\beta}$ cannot be obtained using these equations.

METHOD OF DETERMINING RECEIVER BEAM FORMING VECTORS

In the following a method is described in which the receiver beam forming matrix R is determined based on Cholesky decomposition. In each step of this method the receiver beam forming vector $r_1 \ldots r_K$ for a given receiver is generated by minimising the mean square error in equation (22).

Equation (17) can be re-written as:

$$\Psi = \left(\hat{H}\hat{H}^H + \gamma I\right) \quad (24)$$

$$= LQL^H$$

$$= \begin{pmatrix} 1 & 0 & \cdots & 0 \\ l_{21} & 1 & \cdots & 0 \\ \cdots & \cdots & \cdots & \cdots \\ l_{K1} & l_{K2} & \cdots & 1 \end{pmatrix} \begin{pmatrix} q_1 & 0 & \cdots & 0 \\ 0 & q_3 & \cdots & 0 \\ \cdots & \cdots & \cdots & \cdots \\ 0 & 0 & \cdots & q_K \end{pmatrix} \begin{pmatrix} 1 & l_{21}^* & \cdots & l_{K1}^* \\ 0 & 1 & \cdots & l_{K2}^* \\ \cdots & \cdots & \cdots & \cdots \\ 0 & 0 & \cdots & 1 \end{pmatrix}$$

Based on Cholesky decomposition $q_i$ and $l_{ij}$ can be obtained as:

$$q_i = \Psi_{ii} - \sum_{k}^{i-1} l_{ik} l_{ik}^* q_k \quad (25)$$

$$l_{ij} = \frac{1}{q_j}\left(\Psi_{ij} - \sum_{n}^{j-1} l_{in} l_{jn}^* q_n\right), \text{ for } i > j \quad (26)$$

wherein:

$$\Psi_{ii} = \hat{h}_i \hat{h}_i^H + \gamma \quad (27)$$

$$\Psi_{ij} = \hat{h}_i \hat{h}_j^H \quad (28)$$

As can be seen from equations (25) and (26), $q_i$ is successively generated step by step and is affected by the parameters of previous receivers and of the current receiver. During each step to generate $q_i$ the MSE of equation (23) is minimised by selecting $r_i$ so as to maximise $q_i$.

It will be appreciated from the above that successive determination of the receiver beam forming vectors is possible as Cholesky decomposition of the channel property matrix provides a lower triangular matrix with unit elements along its diagonal. Receivers associated with a particular row of the channel property matrix consequently experience interference from signals to receivers in subsequent rows. However, each receiver interferes with receivers associated with subsequent rows of the channel property matrix. The receiver beam forming vectors of a receiver can therefore be determined taking only the properties of the receivers in preceding rows into account. A row-by-row determination of the receiver beam forming vectors is thus possible. The method may be used for determining receiver beam forming vectors for receivers in a data transmission system using Tomlinson-Harashima precoding, MMSE-based linear precoding or MMSE-based vector perturbation precoding, to name a few.

It will be appreciated that, as a consequence of the above, the receiver associated with the first row of the channel property matrix, or with the first element of the diagonal matrix respectively, can be considered in isolation from the other receivers. The channel of this receiver, however, interferes with other channels and these interferences are taken into account when determining subsequent receiver beam forming vectors. By maximising the elements of the diagonal matrix the means square error of the received signals is minimised.

As a consequence of the manner in which the channel property matrix is decomposed, the only variable in performing the decomposition of a row of the matrix is the receiver-beam forming vector. The receiver-beam forming vector can therefore be chosen to minimise the transmission error. This can be achieved by maximising the element of the diagonal matrix that is being determined by the current step of the Cholesky decomposition routine (as mentioned above). The elements of the associated row of the lower triangular matrix that is also determined during the step of the Cholesky decomposition process can be determined after the element of the diagonal matrix has been determined. A receiver beam forming vector for a receiver can thus be determined based solely with knowledge of the properties of the associated receiver channel, of receiver channels associated with receivers for which receiver beam forming vectors had previously been determined and of interference between these channels. The use of a zero forcing constraint is not required in the above method. The method of the embodiment may increase spatial diversity, giving rise to better system performance.

Figure 2:
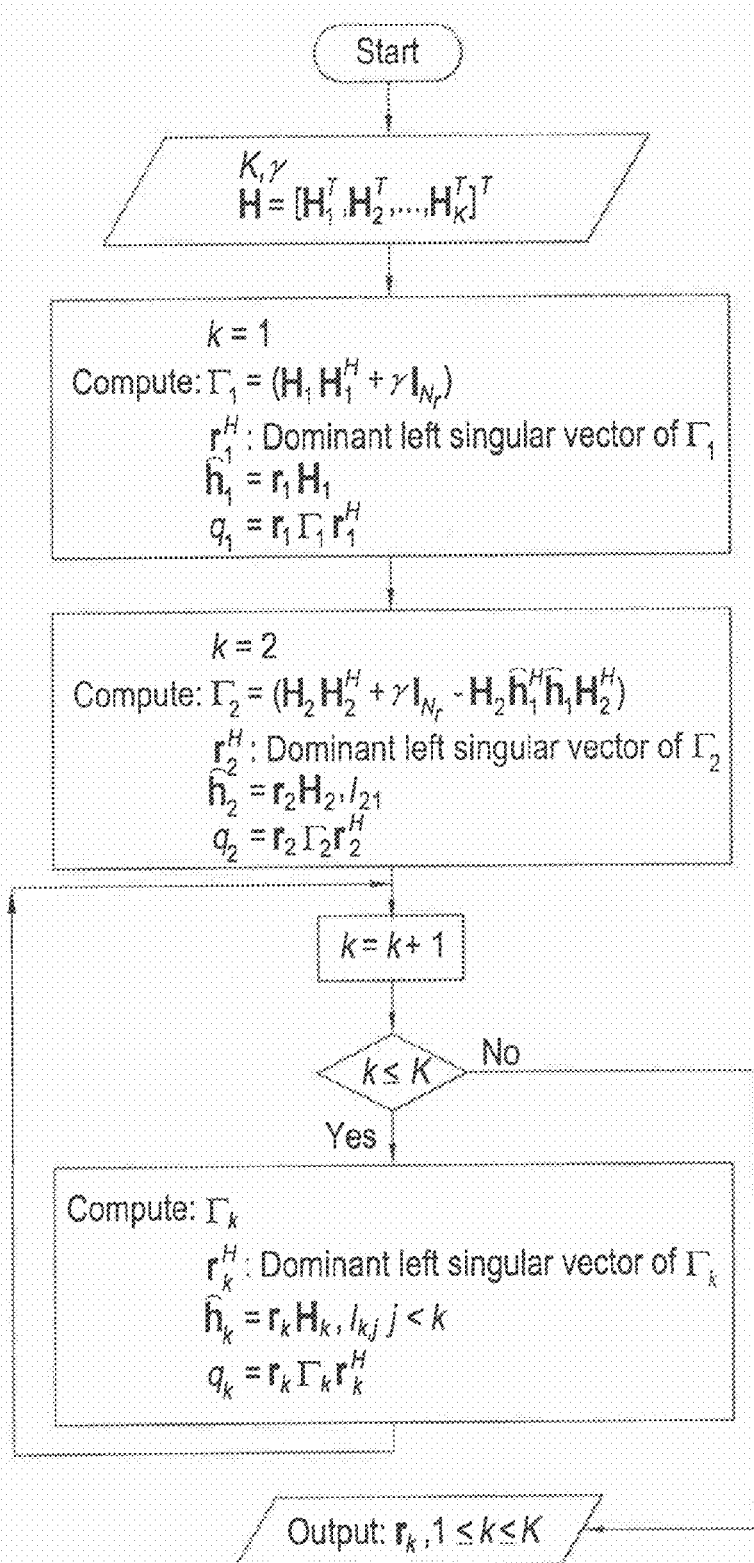
FIG. 2 shows a sequence diagram of an embodiment.

FIG. 2 shows a flow chart illustrating how this can be achieved. In a first step 100 the number K of receivers 20 is defined and γ is determined. The channel matrix H is defined according to equations (1) and (2) above.

It can be seen from equation (24) that for the first receiver $q_1 = \Psi_{11}$ applies. $\Psi$ is defined above in equation (24) and according to this definition $$\Psi_{ii} = \hat{h}_1 \hat{h}_1^H + \gamma \quad (29)$$

applies. Equation (29) can further be re-written as:

$$\Psi_{ii} = \hat{h}_1 \hat{h}_1^H + \gamma = r_1(H_1 H_1^H + \gamma I_{N_r})r_1^H = r_1 \Gamma_1 r_1^H \quad (30)$$

All of the components of $\Gamma_1$ have been determined in step 100 shown in FIG. 2. The Hermitian transpose of the receiver beam forming vector $r_1$ of the first receiver that maximises $\Psi_{11}$ and therefore $q_1$ can thus be determined in step 110 of FIG. 2 as the dominant left singular vector of $\Gamma_1$. Once the receiver beam forming vector $r_1$ of the first receiver has been determined, $\hat{h}_1$ is calculated based on:

$$\hat{h}_1 = r_1 H_1 \quad (31)$$

As can be seen from equation (24) and in analogy with equation (30) above, $q_2$ is:

$$q_2 = \Psi_{22} - l_{21} l_{21}^* q_1 \quad (32)$$

-continued $$= \hat{h}_2 \hat{h}_2^H + \gamma - \frac{\hat{h}_2 \hat{h}_1^H \hat{h}_1 \hat{h}_2^H}{q_1}$$

$$= r_2 \left( H_2 H_2^H + \gamma I_{N_r} - \frac{H_2 \hat{h}_1^H \hat{h}_1 H_2^H}{q_1} \right) r_2^H$$

$$= r_2 \Gamma_2 r_2^H$$

The components of $\Gamma_2$ are again known from the outputs of the preceding steps, steps 100 and 110. In step 120 the Hermitian transpose of the receiver beam forming vector $r_2$ for the second receiver can therefore be determined by calculating the dominant left singular vector of $\Gamma_2$, that is the left singular vector associated with the maximal singular value of $\Gamma_2$. Based on $r_2$ it is possible to calculate $\hat{h}_2$ in analogy with equation (17) and $l_{21}$ based on equation (26).

As can be seen from equation (24) and in analogy with equations (30) and (32) above, $q_3$ can be calculated as:

$$q_3 = \Psi_{33} - l_{31} l_{31}^* q_1 - l_{32} l_{32}^* q_2 \qquad (33)$$

$$= \hat{h}_3 \hat{h}_3^H + \gamma - \frac{\Psi_{31} \Psi_{31}^*}{q_1} - \frac{(\Psi_{32} - l_{31} l_{21}^* q_1)(\Psi_{32} - l_{31} l_{21}^* q_1)^H}{q_2}$$

$$= \hat{h}_3 \hat{h}_3^H + \gamma - \frac{\hat{h}_3 \hat{h}_1^H \hat{h}_1 \hat{h}_3^H}{q_1} -$$

$$\frac{\left(\hat{h}_3 \hat{h}_2^H - \hat{h}_3 \hat{h}_1^H l_{21}^*\right)\left(\hat{h}_3 \hat{h}_2^H - \hat{h}_3 \hat{h}_1^H l_{21}^*\right)^H}{q_2}$$

$$= r_3 \left( H_3 H_3^H + \gamma I_{N_r} - \frac{H_3 \hat{h}_1^H \hat{h}_1 H_3^H}{q_1} - \right.$$

$$\left. \dots \frac{\left(H_3 \hat{h}_2^H - H_3 \hat{h}_1^H l_{21}^*\right)\left(H_3 \hat{h}_2^H - H_3 \hat{h}_1^H l_{21}^*\right)^H}{q_2} \right) r_3^H$$

$$= r_3 \Gamma_3 r_3^H$$

The components of $\Gamma_3$ are again known from the values output by the preceding steps, steps 100, 110 and 120. The Hermitian transpose of the receiver beam forming vector $r_3$ for the third receiver can therefore be determined by calculating the dominant left singular vector of $\Gamma_3$. Based on $r_3$ it is possible to calculate $\hat{h}_3$ in analogy with equation (17) and $l_{31}$ and $l_{32}$ based on equation (26).

From the above description and in light of equations (25) and (26) above, the person skilled in the art will appreciate that each receiver beam forming vector $r_i$ can be calculated based on the values output by computation steps performed to calculate preceding receiver beam forming vectors $r_1$ to $r_{i-1}$. In particular, the matrix $\Gamma_k$ describing the properties of signal transmission to the receiver k in question is determined in the manner described for the first three receivers above. As will be appreciated from the above, this matrix also accounts for the interaction of the received signal with signals transmitted to the other receivers. The Hermitian transpose of the receiver beam forming vector $r_k$ for receiver k is then determined by computing the dominant left singular vector of the matrix $\Gamma_k$.

Based on the newly determined receiver beam forming vector $r_k$ the matrix $\hat{h}_k$ describing the properties of the channel and receiver beam forming matrix as all as $l_{ij}$ per equation (26) can then be calculated, so that the receiver beam forming vectors $r_{k+1}$ of the next receiver can then be determined.

FIG. 2 illustrates this by the loop operations indicated by reference numerals 130 to 150. In first step the number of the receiver k for which the receiver beam forming vector $r_k$ is being determined is incremented in step 130. In step 140 a determination is made if k is smaller or equal the total number of receivers K as defined in step 100, that is if there are still some receiver beam forming vectors to be determined. If this is the case the procedure moves on to step 150, where the matrix $\Gamma_k$ describing the properties of signal transmission to the receiver k in question is determined in the above described manner and based on equations (25) and (26) and the output values of the preceding computational steps. The Hermitian transpose of the receiver beam forming vector $r_k$ for receiver k is then also determined in step 150 by computing the dominant left singular vector of the matrix $\Gamma_k$. Based on $r_k$ the matrix $\hat{h}_k$ for the receiver in question as well as the terms $l_{k,j}$ for j<k are then determined. The procedure then moves on to step 130 to initiate the computation of the receiver beam forming vector for the next receiver. If it is determined in step 140 that all receiver beam forming vectors have already been determined, then the determined vectors are output in step 160.

The determination of the values $l_{ij}$ is based on equation (26). The computation of $l_{ij}$ can be performed prior to determining a receiver beam forming vector $r_i$ in a loop according to the following pseudo code shown in FIG. 3 for the second and higher number receivers, that is for $r_i$ with $i \geq 2$. The loop is initiated in Step 200 and operates a number of times that corresponds to the number of receivers for which receiver beam forming vectors had previously been determined. The number of times the instructions in the loop are repeated thus corresponds to the number of entries in the relevant row of matrix L as shown in equation (24) above.

It will be appreciated that for any of the values $l_{i,l}$, that is for the values in the first column of the matrix L, the sum term shown in equation (26) will be zero. Computation of the first value in each row of L from the second row onwards can therefore be simplified when compared to the computation of values in columns of L other than the first column. For this reason as a first step, step 210, within the loop it is determined whether or not the next value computed is in the first column of the matrix L. If this is the case, then computation is based on a simplified version of equation (26), as set out in step 220 shown in FIG. 3. All other values in the matrix L, that is all values in columns of this matrix other than the first column are computed using the entirety of equation (26), as indicated in Step 230 shown in FIG. 3.

Once all values $l_{ij}$ have been determined, these values can be inserted into equation (25) and the matrix $\Gamma_i$ required for the determination of the beam forming vector of the receiver that is currently being considered can then be derived according to:

$$q_i = \hat{h}_i \hat{h}_i^H + \gamma - \sum_{j=1}^{i-1} l_{ij} l_{ij}^* q_j \qquad (34)$$

$$= r_i H_i H_i^H r_i^H + \gamma - \sum_{j=1}^{i-1} r_i s_{ij} s_{ij}^H r_i^H q_j$$

$$= r_i \left( H_i H_i^H + \gamma I_{N_r} - \sum_{j=1}^{i-1} s_{ij} s_{ij}^H q_j \right) r_i^H$$

$$= r_i \Gamma_i r_i^H$$

As discussed above, it is then possible to compute the Hermitian transpose of the receiver beam forming vector $r_k^H$ by calculating the dominant left singular vector of $\Gamma_i$. Based on this output $\hat{h}_i$ and $l_{ij}$, $i>j$ can be calculated in turn.

It will be appreciated from the above that $q_i$ at the $i^{th}$ step is always obtained as:

$$q_i = r_i \Gamma_i r_i^H \qquad (35)$$

where $\Gamma_i$ is the function of parameters obtained from previous receivers and the channel of current receiver:

$$\Gamma_i = f(H_i, H_j, q_j, l_{k,n}, r_j) \, j,k<i, \, n<j \qquad (36)$$

The minimum mean square error in equation (23) is minimised if $q_i$ is the dominant singular value of $\Gamma_i$ and $r_i^H$ is the corresponding dominant singular vector.

METHOD OF SELECTING A USER/ORDERING USERS

The above described method determines receiver beam forming vectors wherein the receivers are placed in a predetermined order. It may, however, be desirable to alter the order in which the receiver beam forming vectors are determined. It may also be desirable for the most suitable user to be selected from among a plurality of users, for example in a situation where the number of user N attempting to transmit via the MIMO system exceeds the number of receivers K that is for $N \geq K$. A receiver can hereby be called a user without loss of generality. In this case not all users can participate in the network and the most suitable users for participation in the network are thus preferably selected. For the purpose of selection the K users are given indices $\{\pi(1), \ldots, \pi(K)\}$ and the N users are given indices $\{1, 2, \ldots, N\}$.

During the step i of the Cholesky decomposition process, a user $\pi(i)$ is then selected from among the set of users $(\pi(1), \ldots, \pi(i-1))^c$ that remain unselected at the start of this step i. The user selected in this arrangement is the user that has the maximum $q(i)$ from amongst the unselected users.

Figure 4:
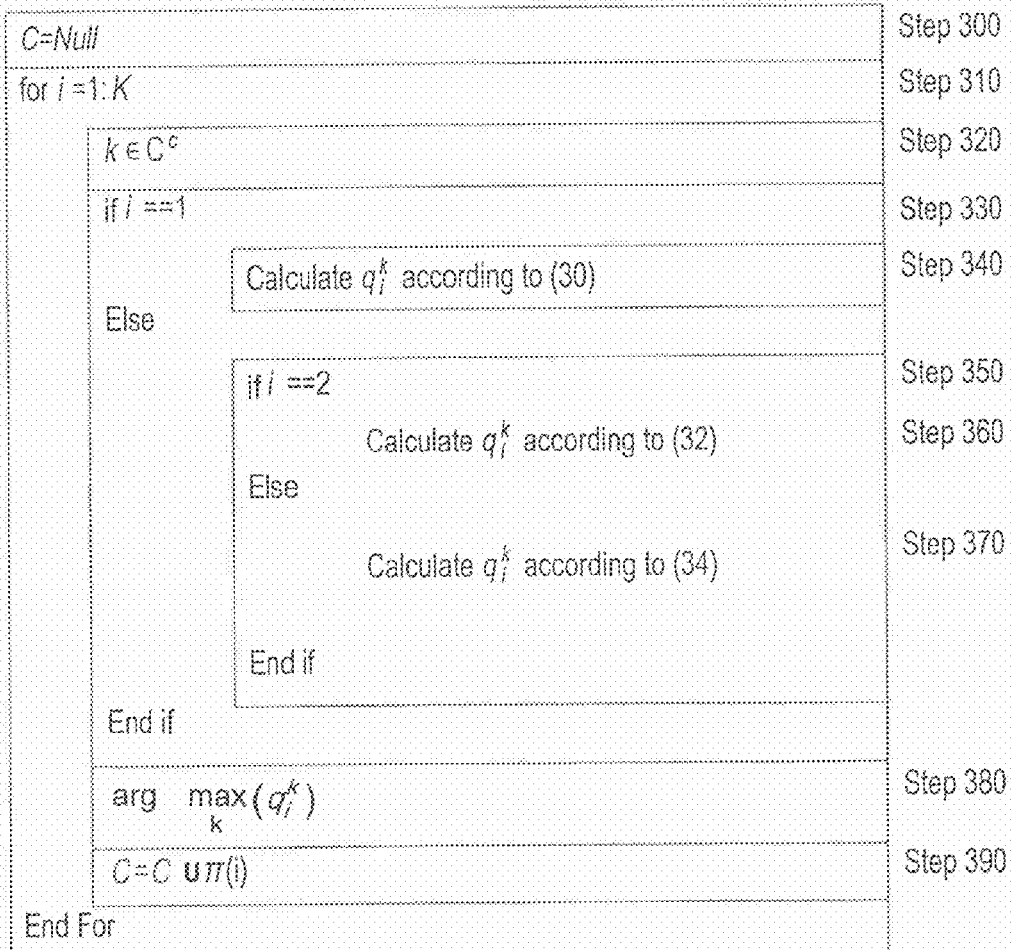
FIG. 4 shows pseudo code for a user selection algorithm.

The pseudo code for this selection process is shown in FIG. 4. $C^c$ is the complement set of C and $C \cup C^c = \{1, 2, \ldots, N\}$. In step 300 the set C is emptied and a loop is entered in Step 310. This loop is repeated K times for the selection of K users from among the N potential users. In Step 320 a subset k comprising those of the N potential users that have thus far not been selected is defined. It is then determined in Step 330 whether a user has already been selected. If this is not the case, that is if i=1, then the values $q_i^k$ can be determined using equation (30). A value $q_i^k$ is determined for each of the remaining unselected users in subset k in Step 340. If the second user is being selected the values $q_i^k$ can be determined using equation (32) in Step 350. Again a value $q_i^k$ is determined for each of the remaining unselected users in subset k in Step 350. The selection of any user beyond the second user can be based on equation (34) in Step 370. In this step a value $q_i^k$ is determined for each of the remaining unselected users in subset k.

Once a value $q_i^k$ has been determined for each of the remaining users in the subset k (be that through Step 340, 360 or 370), the remaining unselected user with the maximum value $q_i^k$ is selected as the $i^{th}$ selected user in Step 380. In step 390 the selected user $\pi(i)$ is then added to the set C. As $C^c$ is/remains the complement set of set C, this step of course reduces the number of remaining users available for selection in the next repetition of the loop shown in FIG. 4. Once this loop has been repeated K-times a full set of users $C = \{\pi(1), \ldots, \pi(K)\}$ has been selected.

It will be appreciate that, because the users are selected using equations (32) and (33), the receiver beam forming vectors for each selected user needs to be calculated before further users can be selected. Thus, once the set of users have been selected all receiver beam forming vectors (with the possible exception of the receiver beam forming vector for the last selected receiver/user) have already been calculated.

Based on the selected set of users C and on the associated receiver beam forming vectors the Cholesky decomposition of $\overline{\psi}$ can be performed in accordance with equation (18) above, thereby providing the feedback matrix B and the pre-coding matrix F as well as $\beta$, using equations (20) to (22) respectively.

As discussed above, a row in a matrix that is decomposed/factorised using Cholesky decomposition does not interfere with the Cholesky decomposition of preceding rows. The receiver property matrices may thus be arranged so that the channel properties of an unselected user currently under investigation are placed in the matrice's last row. This has the advantage that Cholesky decomposition for the rows other than the last row does not have to be repeated. If previously selected users were selected by performing Cholesky decomposition of their receiver property matrices, then the result of this computation are already known and do not have to be determined again. These results can thus be re-used when determining the element of the diagonal matrix associated with the unselected user currently under investigation. It will be appreciated that this can lead to a considerable saving in expenditure of computational resources, in particular if the number of unselected users under investigation is high. The order of the users in the channel property matrix may thus be the order in which the users have been selected.

In an alternative arrangement the precoding matrix F and the feedback matrix B can be determined based on a re-ordered set of users as described in the following. Further details of this ordering method can also be found in Table VI of the Kusume et. al. paper incorporated by reference in its entirety above.

Let $$P\Psi' P^T = P(\hat{H}\hat{H}^H + \gamma I)^{-1} = P^T = L'^H Q'L' \qquad (37)$$

where P is a permutation matrix and $$\tilde{H} = RH \qquad (38)$$

$$R = \begin{bmatrix} r_{\pi(1)} & 0 & 0 & 0 \\ 0 & r_{\pi(2)} & 0 & 0 \\ 0 & 0 & \ldots & 0 \\ 0 & 0 & 0 & r_{\pi(K)} \end{bmatrix} \qquad (39)$$

$$H = [H_{\pi(1)}^T, H_{\pi(2)}^T, \ldots, H_{\pi(K)}^T]^T \qquad (40)$$

Then the precoding matrix F and feed-back matrix B can be obtained as:

$$B' = L'^{-1} \qquad (41)$$

$$F' = \beta' \hat{F} = \beta' \hat{H}^H P^T L'^H Q' \qquad (42)$$

$$\bar{\beta} = \sqrt{\frac{E_s}{\left\|\hat{F}(:,1)\right\|_2^2 + \sigma_v^2 \left\|\hat{F}(:,2:K)\right\|_F^2}} \qquad (43)$$

This alternative manner of determining the feedback matrix and the pre-coding matrix determines the elements of these two matrices in a step by step manner, starting with the data stream that is to be pre-coded last. As a consequence this method provides more accurate results than the first method of calculating the precoding matrix F and feed-back matrix B. This improvement in accuracy, however, comes at the cost of increased computational complexity.

To compare the performance of the embodiments to other methods of determining receiver beam forming vectors, another method where each receiver's beam forming vector is the dominant left singular vector of its channel was evaluated. This method is referred to as 'SVD' in the figures. Also evaluated is an antenna selection method in which each receiver selects one channel, which has maximal norm among its channels. This method is referred to as 'AS' in the figures.

The performance of MMSE THP for the MISO case and ZF THP with receiver beam forming discussed in Min Huang et. al, (incorporated by reference in its entirety above) are also presented in the figures for comparison. The precoding and feedback matrices of the preferred embodiment are generated with user ordering based on equations (41) to (43).

The above methods were evaluated based on a simulation for a transmitter having four transmit antennae and communication with four receivers, each equipped with four receiver antennae. The simulations assume that the channel impulse response taps are independent and identically distributed (i.i.d.) with zero-mean Gaussian distribution. The simulation is further based on QPSK/16QAM modulation.

Figure 5:
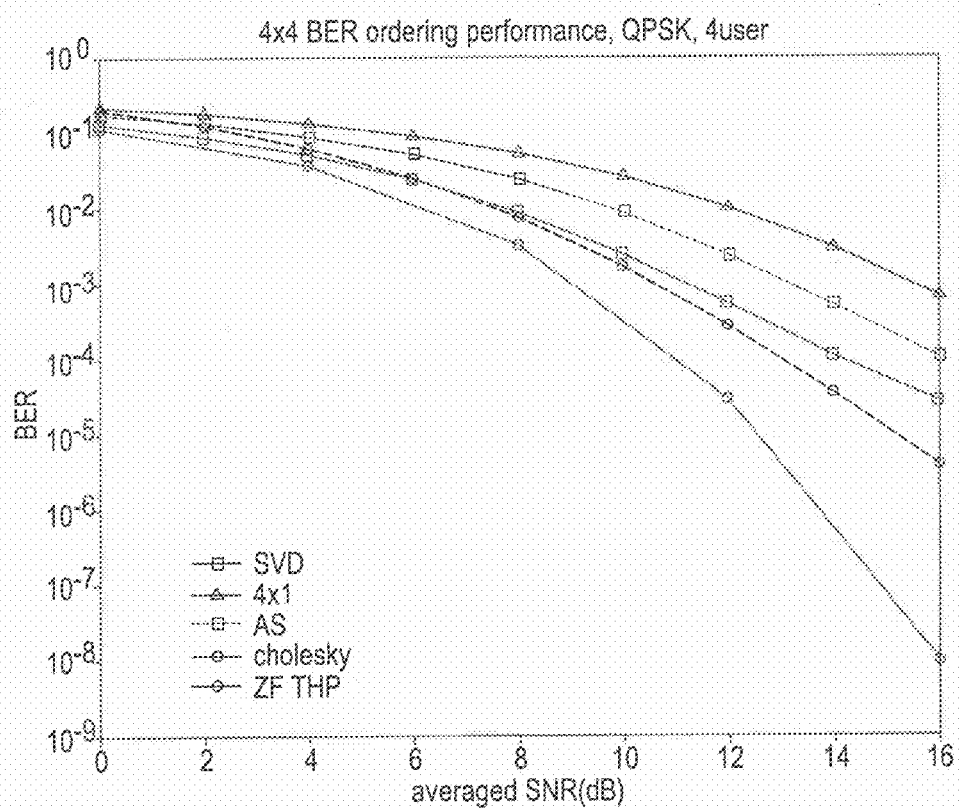
FIGS. 5 and 6 show simulation results comparing a system with receiver beam forming vectors determined based on the embodiment with known systems.

FIG. 5 illustrates the simulation results for QPSK modulation for receivers having four receiver antennae. It can be seen that the performances of the system using the receiver beam forming method of the preferred embodiment are considerably better than performance of the MMSE THP system for the MISO case (labelled 4×1 in FIG. 5) and that of the Zero-forcing THP proposed by Min Huang et. al. As can be seen from FIG. 3, the performance of the system operating based on the Cholesky based method of determining receiver beam forming vectors of the preferred embodiment provides considerable reductions in the bit error rate when compared to the systems operating based on the other methods.

Figure 6:
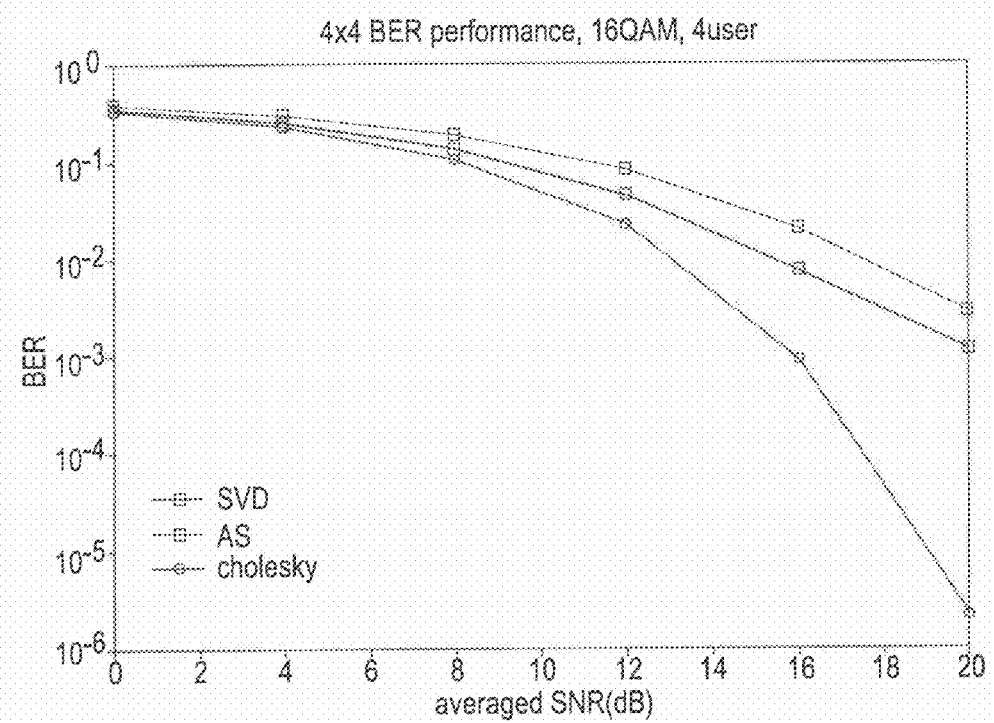

FIG. 6 illustrates the simulation results for 16QAM modulation. It can again be seen that the system operating using the receiver beam forming vectors determined by the Cholesky based method of the preferred embodiment outperforms the comparative systems.

Figure 7:
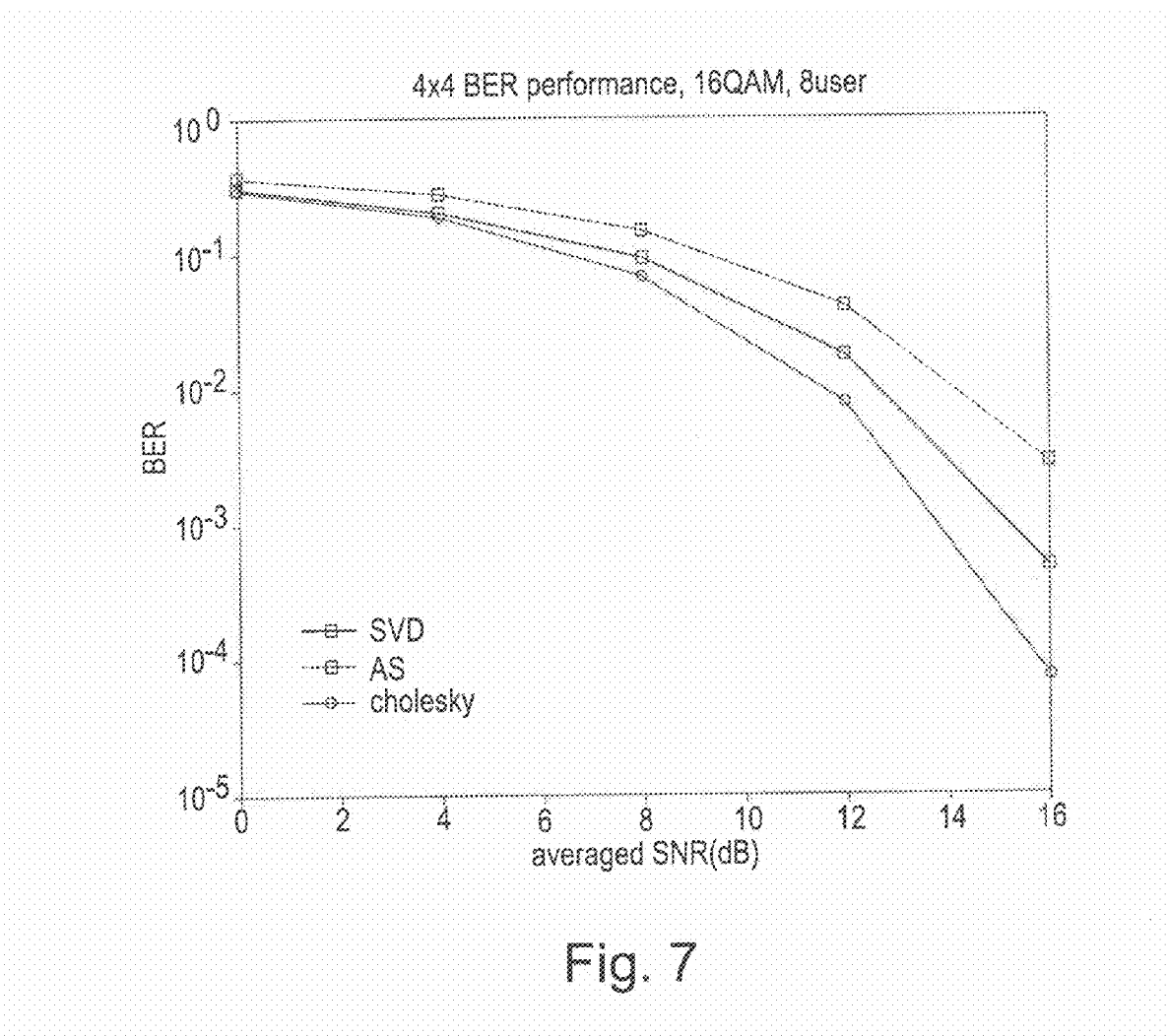
FIG. 7 shows simulation results comparing a system with receiver beam forming vectors determined based on and users selected using the embodiment with known systems.

FIG. 7 illustrates simulation results for 16QAM modulation based on the assumption that the four users are selected from among eight potential users. For the 'SVD' and 'AS' schemes typical semi-orthogonal user selection is used. It will be appreciated from FIG. 5 that the performance of the proposed system using Cholesky-based user selection and receiver beam forming vector determination provides improvements over the 'SVD' and 'AS' schemes.

It will be appreciated that the above description of the embodiments is by way of example only. The person skilled in the art would readily appreciate modifications to this method. The method could, for example, be also applied to other MMSE-based precoding schemes based on Cholesky decomposition, such as vector perturbation precoding schemes, where the receiver beam forming vectors are generated firstly based on the Cholesky decomposition according to the method of a preferred embodiment and then vector perturbation precoding is conducted. One example for vector precoding can be found in "Minimum mean square error vector precoding", Proc. 16$^{th}$ IEEE Symp. on Personal, Indoor and Mobile Radio Communications, 2005 by D. Schmidt, M. Joham, and W. Utschick, the entirety of which is incorporated herein by this reference.

While certain embodiments have been described, the embodiments have been presented by way of example only, an area not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of determining receiver beam forming vectors for a plurality of receivers in a MIMO system, wherein each receiver comprises a plurality of receiver antennae and wherein the MIMO system comprises a plurality of transmitter antennae, the method comprising:

quantifying the characteristics of the channels of the MIMO system in a channel property matrix $\Psi$ including interference between individual channels, performing Cholesky decomposition of the channel property matrix row-by-row into a lower triangular matrix with unit elements along its diagonal, a diagonal matrix and the Hermitian transpose of the lower triangular matrix, comprising determining, when performing a step of the Cholesky decomposition for a row, a receiver beam forming vector associated with the row that maximises the component of the diagonal matrix in the row;

wherein the matrix quantifying the characteristics of said channel is:

$$H_i H_i^H + \gamma I_{N_r} - \sum_{j=1}^{i-1} s_{ij} s_{ij}^H q_j$$

for i rows/steps of the Cholesky decomposition for i>0, wherein $H_i$ is the channel matrix of the receiver associated with a current row/step of the Cholesky decomposition, $H_i^H$ is the Hermitian transpose of $H_i$, $\gamma$ is the expectation of noise that will be received $I_{N_r}$ is an $N_r \times N_r$ identity matrix, wherein $N_r$ is the number of receiver antennae of the receiver, $s_{ij}$ is $$s_{ij} = \begin{cases} \dfrac{H_i \hat{h}_i^H}{q_1} & \text{if } j = 1 \\ \dfrac{\left(H_i \hat{h}_j^H - \sum_{n=1}^{j-1} s_{in} l_{jn}^* q_n\right)}{q_j} & \text{if } j > 1 \end{cases}$$

$\hat{h}_j^H$ is the Hermitian transpose of $r_j H_j$, wherein $r_j$ is the receiver beam forming vector associated with the j-th element of the diagonal matrix, $H_j$ is the channel matrix associated with the j-th element of the diagonal matrix, $q_i$ is:

$$q_i = \Psi_{ii} - \sum_k l_{ik} l_{ik}^* q_k$$

wherein:

$$l_{ij} = \frac{1}{q_j}\left(\Psi_{ij} - \sum_{n}^{j-1} l_{in}l_{jn}^* q_n\right), \text{ for } i > j$$

$$l_{ij} = 1, \text{ for } i = j$$

$$l_{ij} = 0, \text{ for } i < j$$

$$\Psi_{ii} = \hat{h}_i\hat{h}_i^H + \gamma \text{ and } \Psi_{ij} = \hat{h}_i\hat{h}_j^H$$

$$\hat{h}_i = r_i H_i$$

$s_{ij}^H$ is the Hermitian transpose of $s_{ij}$, $l_{jn}^*$ is the conjugate of $l_{jn}$.

2. A method according to claim 1, wherein maximising said component of the diagonal matrix comprises determining a left singular vector of the matrix quantifying the characteristics of the channel associated with an element of the diagonal matrix, wherein said left singular vector of the matrix is the left singular vector associated with the maximal singular value of the matrix.

3. A method according to claim 1, wherein the matrix quantifying the characteristics of said channel quantifies channel gain, channel noise and said channel's interference with channels of receivers for which a beam forming vector had previously been determined.

4. A method according to any of claim 1, wherein the matrices provided by the Cholesky decomposition of the channel property matrix $\Psi$ are:

$$\Psi = LQL^H$$
$$= \begin{pmatrix} 1 & 0 & \ldots & 0 \\ l_{21} & 1 & \ldots & 0 \\ \ldots & \ldots & \ldots & \ldots \\ l_{K1} & l_{K2} & \ldots & 1 \end{pmatrix}\begin{pmatrix} q_1 & 0 & \ldots & 0 \\ 0 & q_3 & \ldots & 0 \\ \ldots & \ldots & \ldots & \ldots \\ 0 & 0 & \ldots & q_K \end{pmatrix}\begin{pmatrix} 1 & l_{21}^* & \ldots & l_{K1}^* \\ 0 & 1 & \ldots & l_{K2}^* \\ \ldots & \ldots & \ldots & \ldots \\ 0 & 0 & \ldots & 1 \end{pmatrix}$$

wherein L is the lower triangular matrix and has unit elements along its diagonal, Q is the diagonal matrix and $L^H$ is the Hermitian transpose of L, wherein $q_1$ to $q_K$ are the elements of the diagonal matrix defined as:

$$q_i = \Psi_{ii} - \sum_{k}^{i-1} l_{ik}l_{ik}^* q_k$$

wherein:

$$l_{ij} = \frac{1}{q_j}\left(\Psi_{ij} - \sum_{n}^{j-1} l_{in}l_{jn}^* q_n\right), \text{ for } i > j$$

$$\Psi_{ii} = \hat{h}_i\hat{h}_i^H + \gamma \text{ and } \Psi_{ij} = \hat{h}_i\hat{h}_j^H$$

$$\hat{h}_i = r_i H_i$$

wherein $l_{ik}^*$ is the conjugate of $l_{ik}$, $H_i$ is the channel matrix of the receiver associated with a current row/step of the Cholesky decomposition, $\gamma$ is the expectation of noise that will be received and $r_i$ is the receiver beam forming vector associated with the current row/step of the Cholesky decomposition.

5. A method of determining a receiver beam forming vector for a receiver of a plurality of receivers in a MIMO system, wherein each receiver comprises plural receiver antennae, the method comprising:
  forming a matrix quantifying the characteristics of a channel of the receiver and interference said receiver experiences from other receivers for which a receiver beam forming vector had previously been determined,
  wherein the matrix quantifying the characteristics of said channel is:

$$H_i H_i^H + \gamma I_{N_r} - \sum_{j=1}^{i-1} s_{ij} s_{ij}^H q_j$$

for i rows/steps of the Cholesky decomposition for i>0, wherein $H_i$ is the channel matrix of the receiver associated with a current row/step of the Cholesky decomposition, $H_i^H$ is the Hermitian transpose of $H_i$, $\gamma$ is the expectation of noise that will be received, $I_{N_r}$ is an $N_r \times N_r$ identity matrix, wherein $N_r$ is the number of receiver antennae of the receiver, $s_{ij}$ is $$s_{ij} = \begin{cases} \dfrac{H_i\hat{h}_i^H}{q_1} & \text{if } j = 1 \\ \dfrac{\left(H_i\hat{h}_j^H - \sum_{n=1}^{j-1} s_{in}l_{jn}^* q_n\right)}{q_j} & \text{if } j > 1 \end{cases}$$

$\hat{h}_j^H$ is the Hermitian transpose of $r_j H_j$, wherein $r_j$ is the receiver beam forming vector associated with the j-th element of the diagonal matrix, $H_j$ is the channel matrix associated with the j-th element of the diagonal matrix, $q_i$ is:

$$q_i = \Psi_{ii} - \sum_{k}^{i-1} l_{ik}l_{ik}^* q_k$$

wherein:

$$l_{ij} = \frac{1}{q_j}\left(\Psi_{ij} - \sum_{n}^{j-1} l_{in}l_{jn}^* q_n\right), \text{ for } i > j$$

$$l_{ij} = 1, \text{ for } i = j$$

$$l_{ij} = 0, \text{ for } i < j$$

$$\Psi_{ii} = \hat{h}_i\hat{h}_i^H + \gamma \text{ and } \Psi_{ij} = \hat{h}_i\hat{h}_j^H$$

$$\hat{h}_i = r_i H_i$$

$s_{ij}^H$ is the Hermitian transpose of $s_{ij}$, $l_{jn}^*$ is the conjugate of $l_{jn}$; and
  determining the receiver beam forming vector including determining a left singular vector of the matrix that corresponds to the maximal singular value of the matrix.

6. A method according to claim 1, further comprising determining a precoding and/or a feedback matrix for a transmitter using Tomlinson-Harashima precoding after two or more of the beam forming vectors have been determined.

7. A device for determining receiver beam forming vectors for a plurality of receivers in a MIMO system, wherein each receiver comprises a plurality of receiver antennae and wherein the MIMO system comprises a plurality of transmitter antennae, the device comprising:
  a quantifier for quantifying in a channel property matrix the characteristics of receiver channels of the MIMO system, including interference between individual channels,
  a processor arranged to perform Cholesky decomposition of the channel property matrix in a row-by-row fashion into a lower triangular matrix with unit elements along its diagonal, a diagonal matrix and the Hermitian transpose of the lower triangular matrix, wherein the processor is further arranged to determine, when performing a step of the Cholesky decomposition for a row, a receiver beam forming vector associated with the row that maximises the component of the diagonal matrix in the row;
  wherein the matrix quantifying the characteristics of said channel is:

$$H_i H_i^H + \gamma I_{N_r} - \sum_{j=1}^{i-1} s_{ij} s_{ij}^H q_j$$

for i rows/steps of the Cholesky decomposition for i>0, wherein $H_i$ is the channel matrix of the receiver associated with a current row/step of the Cholesky decomposition, $H_i^H$ is the Hermitian transpose of $H_i$, $\gamma$ is the expectation of noise that will be received, $I_{N_r}$ is an $N_r \times N_r$ identity matrix, wherein $N_r$ is the number of receiver antennae of the receiver, $s_{ij}$ is $$s_{ij} = \begin{cases} \dfrac{H_i \hat{h}_j^H}{q_1} & \text{if } j = 1 \\ \dfrac{\left(H_i \hat{h}_j^H - \sum_{n=1}^{j-1} s_{in} l_{jn}^* q_n\right)}{q_j} & \text{if } j > 1 \end{cases}$$

$\hat{h}_j^H$ is the Hermitian transpose of $r_j H_j$, wherein $r_j$ is the receiver beam forming vector associated with the j-th element of the diagonal matrix, $H_j$ is the channel matrix associated with the j-th element of the diagonal matrix, $q_i$ is:

$$q_i = \Psi_{ii} - \sum_k l_{ik} l_{ik}^* q_k$$

wherein:

$$l_{ij} = \frac{1}{q_j}\left(\Psi_{ij} - \sum_n^{j-1} l_{in} l_{jn}^* q_n\right), \text{ for } i > j$$

$l_{ij} = 1$, for $i = j$ $l_{ij} = 0$, for $i < j$ $\Psi_{ii} = \hat{h}_i \hat{h}_i^H + \gamma$ and $\Psi_{ij} = \hat{h}_i \hat{h}_j^H$ $\hat{h}_i = r_i H_i$ $s_{ij}^H$ is the Hermitian transpose of $s_{ij}$, $l_{jn}^*$ is the conjugate of $l_{jn}$.

8. A device according to claim 7, wherein the processor is arranged to maximise the component of the diagonal matrix by determining a left singular vector of the matrix quantifying the characteristics of the channel associated with an element of the diagonal matrix, wherein said left singular vector of the matrix is the left singular vector associated with the maximal singular value of the matrix.

9. A device for determining a receiver beam forming vector for a receiver of a plurality of receivers in a MIMO system, wherein each receiver comprises plural receiver antennae, the device comprising:
  a quantifier for quantifying in a matrix the characteristics of a channel of the receiver and interference said receiver experiences from other receivers for which a receiver beam forming vector had previously been determined,
  wherein the matrix quantifying the characteristics of the said channel is:

$$H_i H_i^H + \gamma I_{N_r} - \sum_{j=1}^{i-1} s_{ij} s_{ij}^H q_j$$

for i rows/steps of the Cholesky decomposition for i>0, wherein $H_i$ is the channel matrix of the receiver associated with a current row/step of the Cholesky decomposition, $H_i^H$ is the Hermitian transpose of $H_i$, $\gamma$ is the expectation of noise that will be received, $I_{N_r}$ is an $N_r \times N_r$ identity matrix, wherein $N_r$ is the number of receiver antennae of the receiver, $s_{ij}$ is $$s_{ij} = \begin{cases} \dfrac{H_i \hat{h}_i^H}{q_1} & \text{if } j = 1 \\ \dfrac{\left(H_i \hat{h}_j^H - \sum_{n=1}^{j-1} s_{in} l_{jn}^* q_n\right)}{q_j} & \text{if } j > 1 \end{cases}$$

$\hat{h}_j^H$ is the Hermitian transpose of $r_j H_j$, wherein $r_j$ is the receiver beam forming vector associated with the j-th element of the diagonal matrix, $H_j$ is the channel matrix associated with the j-th element of the diagonal matrix, $q_i$ is:

$$q_i = \Psi_{ii} - \sum_k^{i-1} l_{ik} l_{ik}^* q_k$$

wherein:

$$l_{ij} = \frac{1}{q_j}\left(\Psi_{ij} - \sum_n^{j-1} l_{in} l_{jn}^* q_n\right), \text{ for } i > j$$

$l_{ij} = 1$, for $i = j$ $l_{ij} = 0$, for $i < j$ $\Psi_{ii} = \hat{h}_i \hat{h}_i^H + \gamma$ and $\Psi_{ij} = \hat{h}_i \hat{h}_j^H$ $\hat{h}_i = r_i H_i$ $s_{ij}^H$ is the Hermitian transpose of $s_{ij}$, $l_{jn}^*$ is the conjugate of $l_{jn}$; and a processor arranged to determine the receiver beam forming vector, wherein the processor is arranged to determine a left singular vector of the matrix that corresponds to the maximal singular value of the matrix.

a processor arranged to perform Cholesky decomposition of the received matrix in a row-by-row fashion into a lower triangular matrix with unit elements along its diagonal, a diagonal matrix and the Hermitian transpose of the lower triangular matrix, wherein the processor is further arranged to determine, when performing a step of the Cholesky decomposition for a row, a receiver beam forming vector associated with the row that maximises the component of the diagonal matrix in the row.

10. A device according to claim 7, wherein the processor is further arranged to determine a precoding matrix and/or a feedback matrix for a transmitter using Tomlinson-Harashima precoding after two or more of the receiver beam forming vectors have been determined.

11. A non-transitory computer readable medium comprising computer executable instructions which, when executed by a computer, cause said computer to perform a method in accordance with claim 1.

* * * * *